United States Patent [19]
Donaldson

[11] 3,938,403
[45] Feb. 17, 1976

[54] MULTIRATIO POWER TRANSMITTING DEVICE

[75] Inventor: James M. Donaldson, Fort Wayne, Ind.

[73] Assignee: Bowmar Instrument Corporation, Fort Wayne, Ind.

[22] Filed: Feb. 27, 1974

[21] Appl. No.: 446,154

[52] U.S. Cl.............. 74/217 CV; 74/244; 74/230.23; 280/236
[51] Int. Cl.² .................. F16H 55/30; F16H 55/52
[58] Field of Search............ 74/243 R, 244, 230.23, 74/217 R, 217 CV, 230.18; 280/237, 236

[56] References Cited
UNITED STATES PATENTS

| 522,427 | 7/1894 | Leggo, Jr. ............................ 74/244 |
| 593,285 | 11/1897 | Eyck .................................... 74/244 |
| 598,654 | 2/1898 | Cleland ................................ 74/244 |
| 740,829 | 10/1903 | Dumaresq ............................ 74/244 |
| 1,446,294 | 2/1923 | Healey ................................. 74/244 |
| 2,421,368 | 6/1947 | Aubert ................................. 74/244 |
| 3,372,608 | 3/1968 | Gleasman ........................ 74/750 B |
| 3,798,989 | 3/1974 | Hunt .................................... 74/244 |
| 3,850,045 | 11/1974 | Hagen .................................. 74/244 |
| 3,867,851 | 2/1975 | Gregory et al. ...................... 74/244 |

FOREIGN PATENTS OR APPLICATIONS
567,971 12/1932 Germany .............................. 74/244

*Primary Examiner*—Samuel Scott
*Assistant Examiner*—A. Russell Burke

[57] ABSTRACT

A multiratio drive which comprises a drive plate mounted for rotation upon an axis and means for drivingly coupling the drive plate to a source of motive power. A plurality of driven elements are mounted to the drive plate for sliding movement therewith in a direction radially of the axis. Cam means operatively engage the driven elements, the cam means also being mounted for rotation about the axis, the cam means positioning the driven elements at selected ones of a plurality of radially spaced-apart positions in response to relative rotational movement between the cam means and the driven elements. Detent means restrain the driven elements and cam means from relative rotation and shift means are provided for forcing selected relative rotational movement between the driven elements and the cam means to thereby alter the relative rotational positions thereof and correspondingly to alter the radial position of the driven elements and the effective diameter of the drive device.

14 Claims, 10 Drawing Figures

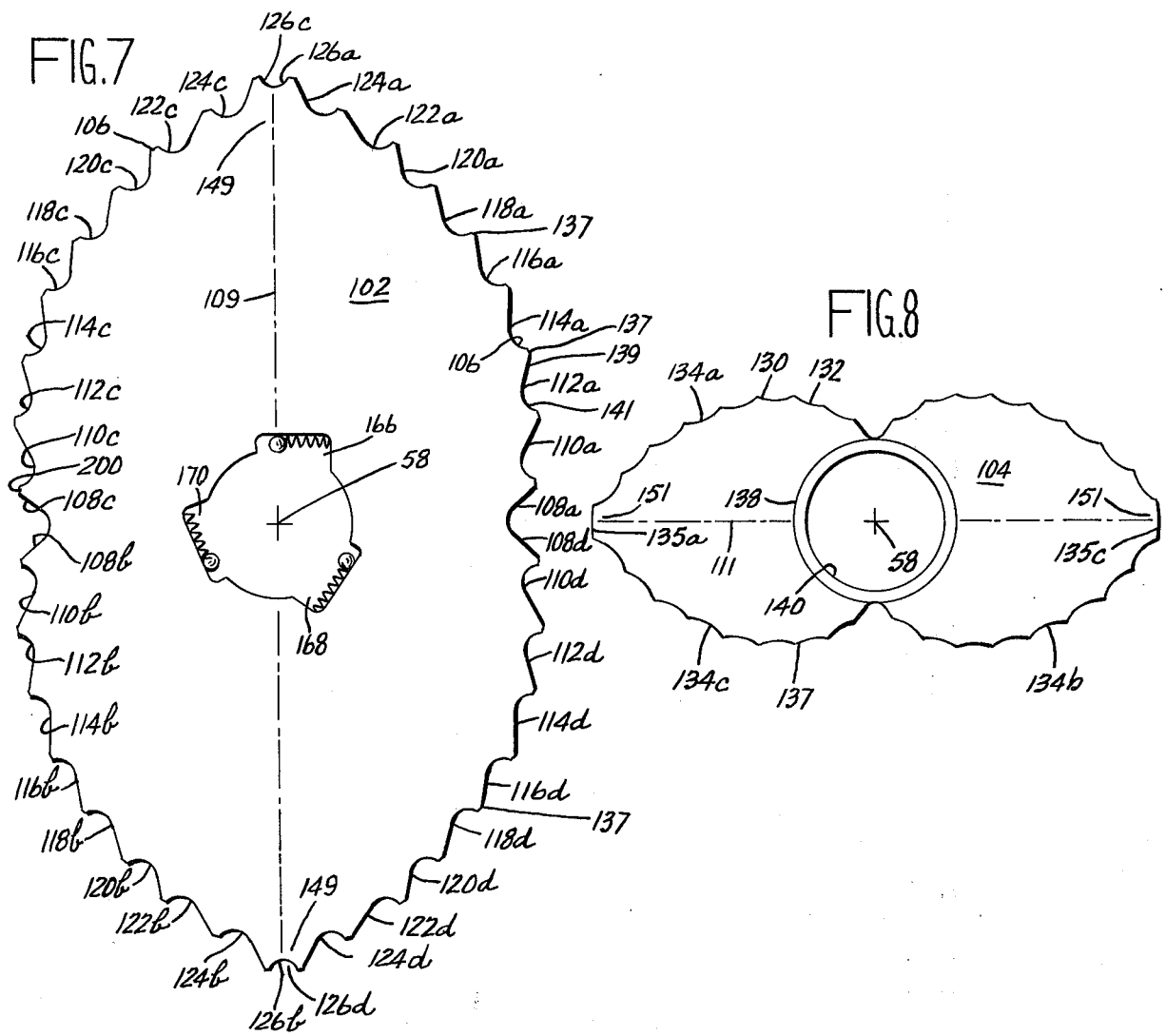
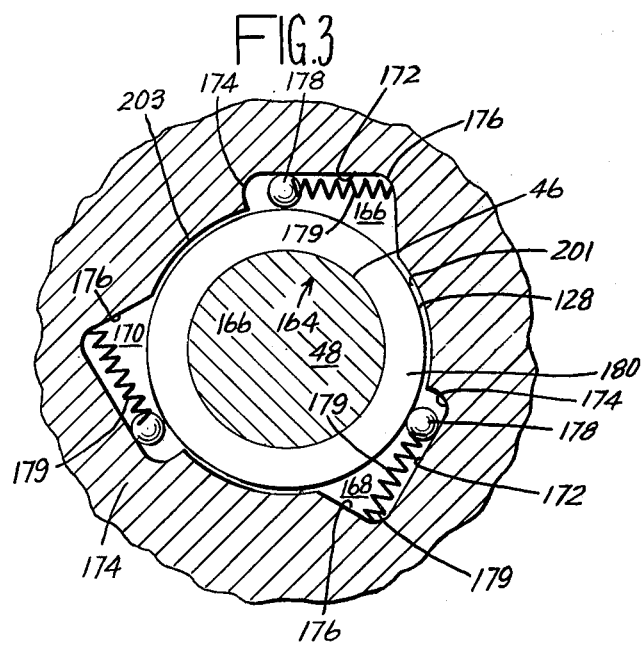
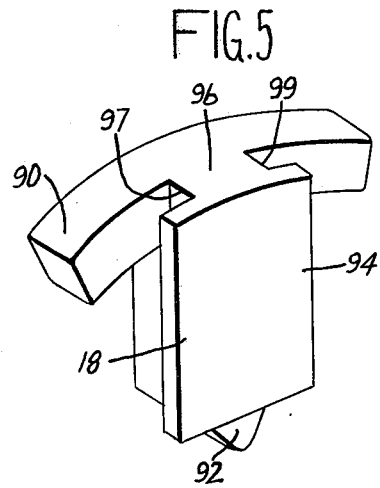

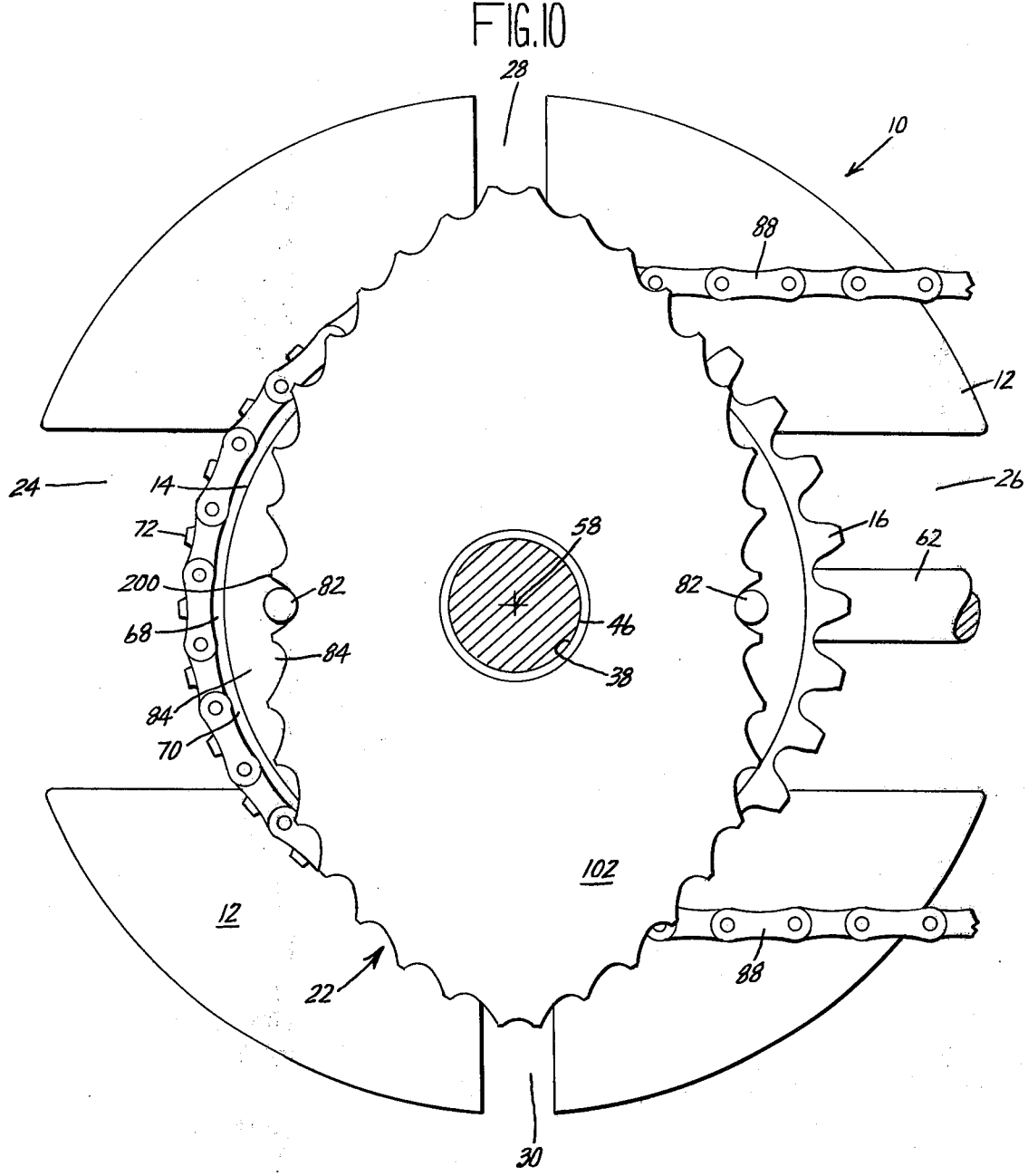

MULTIRATIO POWER TRANSMITTING DEVICE

BACKGROUND OF THE INVENTION

1. Field of the Invention

The present invention relates to variable ratio drive mechanisms and in particular to such a device suitable for use in bicycles or the like wherein the drive mechanism provides a selectively variable drive ratio.

2. Description of the Prior Art

Multiratio drive mechanisms or transmissions and in particular such devices for use with a bicycle are well known and have been in use for many years. One such device that has gained wide acceptance is a three speed or three ratio device which is mounted within the hub of the rear wheel of a bicycle and which can be manually shifted from one ratio to another by means of a finger operated lever and cable.

In recent years another form of transmission has gained popularity. This transmission is commonly referred to as a "derailler". This transmission comprises broadly a plurality of juxtaposed sprockets mounted to the driven wheel, the pedals, or both, of a bicycle and includes a chain "take-up" device and cable mechanism for causing the bicycle chain to jump from one combination of sprockets to another to thereby provide a plurality of drive ratios. Other forms of multiratio transmissions are also known and typically comprise a multiplicity of sprocket segments mounted to a drive plate. The sprocket segments are arranged in groups to define a plurality of segmented sprockets of different diameters with different groups of the sprocket segments being operated by means of a lever and cable mechanism to cause individual groups of the sprockets to engage the bicycle chain at any one time. The latter two types of bicycle transmissions have the advantage of providing a greater number of drive ratios for a bicycle. However, these latter types of transmissions, when adapted to provide a maximum number of ratios such as, for example, ten ratios, require the use of a substantial number of sprockets or sprocket segments, require the use of two separate shift levers, and have a tendency to allow the bicycle chain to become totally disengaged therefrom if not shifted properly. Further, in the "ten speed" or ten ratio models, a plurality of sprockets must be provided both at the driven wheel and at the pedal portions of the bicycle whereby the transmission is relatively complex.

SUMMARY OF THE INVENTION

Broadly, the present invention is a multiratio drive for use with vehicles such as a bicycle which provides as many as ten different drive ratios and wherein the portions of the drive that provide the different ratios are mounted on a single one of the driven wheel or pedal axles or shaft. In a specific embodiment of the invention, the multiratio drive is mounted to the pedals of the bicycle and shifting thereof is effected by manipulation of the pedals without the use of cables, levers, or the like. A single group or array of elements is utilized for all of the ratios.

Broadly, the mechanism comprises a drive plate mounted for rotation about an axis and means for drivingly coupling the drive plate to a source of motive power, typically, the pedals of the bicycle. A plurality of driven elements are mounted to the drive plate for sliding movement radially of the aforementioned axis, the drive elements being disposed in a generally circular array and alternate ones of the driven elements including means for operatively engaging an endless drive element, typically, a bicycle chain. Cam means are also mounted for rotation about the axis, the cam means operatively engaging the driven elements for positioning said driven elements at selected ones of a plurality of radially spaced-apart positions in response to relative rotation between the driven elements and the cam means. Detent means are coupled between the driven elements and the cam means for restraining same against relative movement and shift means are provided for causing selected relative rotational movement between the driven elements and the cam means. This relative movement alters the relative rotational positions of the cam means and driven elements such that the driven elements are equally radially spaced for all relative positions of the driven elements and the cam means.

In a specific embodiment, the cam means is mounted for rotation about the aforementioned axis by means of a unidirectional clutch such that the cam means rotates freely with the driven elements when the latter are rotating in a power transmitting or driving direction, the cam means being maintained in relative rotational position with respect to the driven elements by the detent means. Counter rotation of the pedal elements, however, causes counter rotation of the driven elements while the cam means is restrained therefrom by the unidirectional clutch thereby effecting relative rotational movement therebetween and effecting selected changes in the effective diameter of the driven element array and a corresponding change in the drive ratio.

Also in a specific embodiment of the invention, alternate ones of the driven elements are provided with means for operatively engaging an endless drive element while others of the driven elements slidably engage the endless drive element. Correspondingly, at predetermined positions of the driven elements, only one of those ones of the driven elements which includes the engaging means is engaged with the endless drive element whereby the latter does not restrain radial movement thereof by the cam means.

The cam means can have ten relative rotational positions with respect to the driven elements thereby providing ten different drive ratios. When the drive is provided with the unidirectional clutch, shifting is effected without the use of cables, hand levers, and the like, whereby the operator's hand need not be removed from the handlebars of the bicycle for shifting. All of the ratio changing mechanism is mounted to the pedals of the bicycle and, in a specific embodiment of the invention, only four driven elements are required, thereby substantially reducing the complexity of such a transmission.

It is therefore an object of the invention to provide an improved multiratio drive.

It is another object of the invention to provide a multiratio drive having as many as ten drive ratios with all of the ratio altering components being in a single assembly.

It is yet another object of the invention to provide a multiratio drive that can be shifted without external cables, levers, and the like.

Another object of the invention is to provide a multiratio drive for use on a bicycle wherein shifting can be performed by manipulation of the pedals.

Yet another object of the invention is to provide a multiratio drive which includes a plurality of radially moveable driven elements and a cam means operatively engaged therewith, the driven elements and cam means being relatively rotatable to effect alteration of the drive ratio.

Another object of the invention is to provide a multiratio drive wherein all of the ratio altering components are arranged in a single assembly.

Still another object of the invention is to provide a multiratio drive of reduced complexity, reliable operation, and economical to produce.

Still another object of the invention is to provide a multiratio drive wherein alteration of the drive ratio does not change the alignment of a chain or the like coupled between the drive and a driven sprocket.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein:

FIG. 3 is a fragmentary sectional view showing details of the unidirectional clutch for use with the present invention;

FIGS. 5 and 6 are perspective views showing details of others of the driven elements;

FIGS. 7 and 8 are plan views of portions of the cam means;

FIG. 10 is a plan view of the drive of the present invention.

DESCRIPTION OF A SPECIFIC EMBODIMENT

Figure 1:
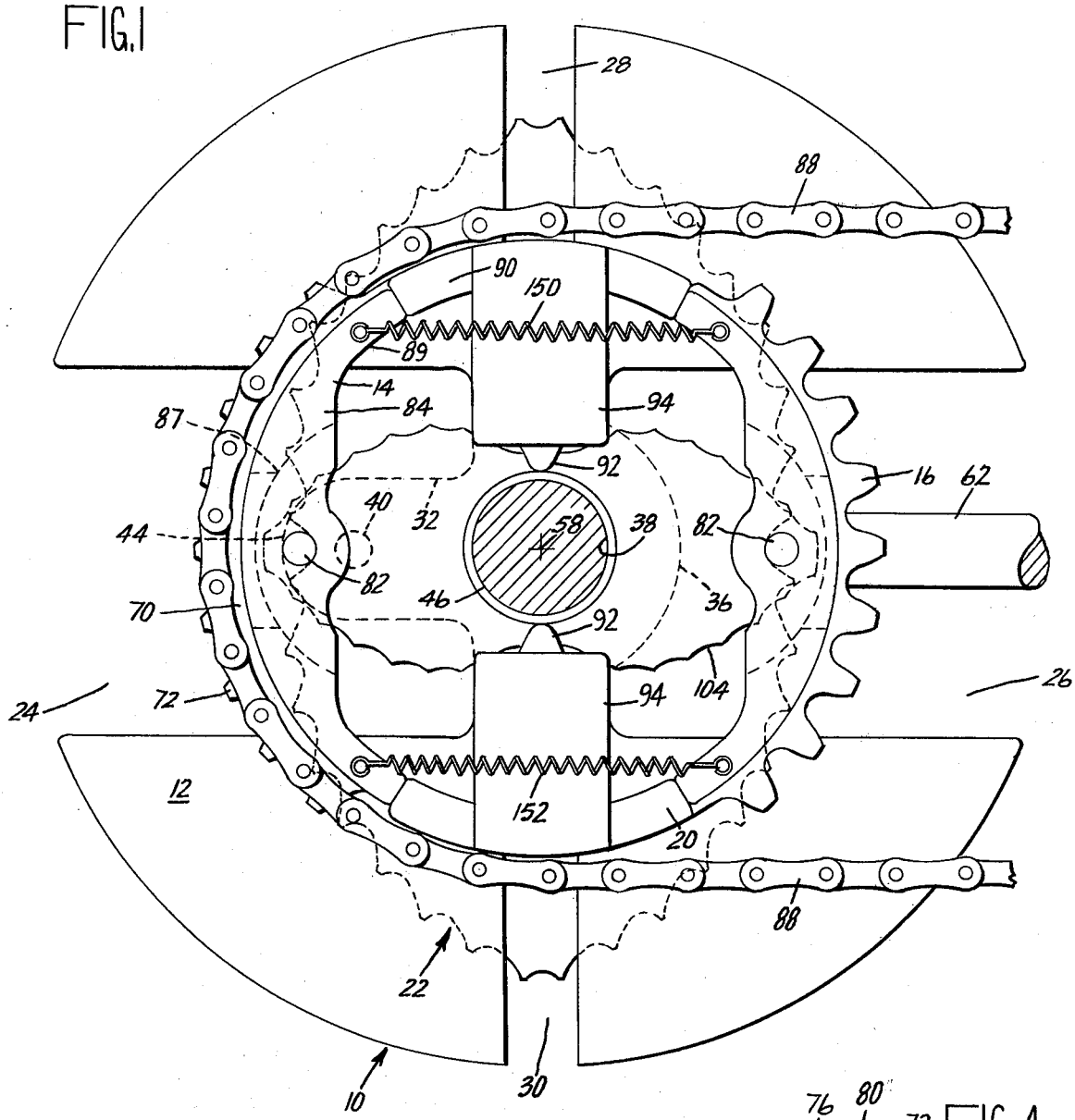
FIG. 1 is a side plan view of a multiratio drive in accordance with the present invention with portions of the cam means shown in phantom for clarity.

Referring now to the drawings, there is illustrated in the drawings a multiratio drive 10. Drive 10 comprises a drive plate 12, a plurality of driven elements 14, 16, 18, and 20, and cam means 22 all described in greater detail below.

Figure 2:
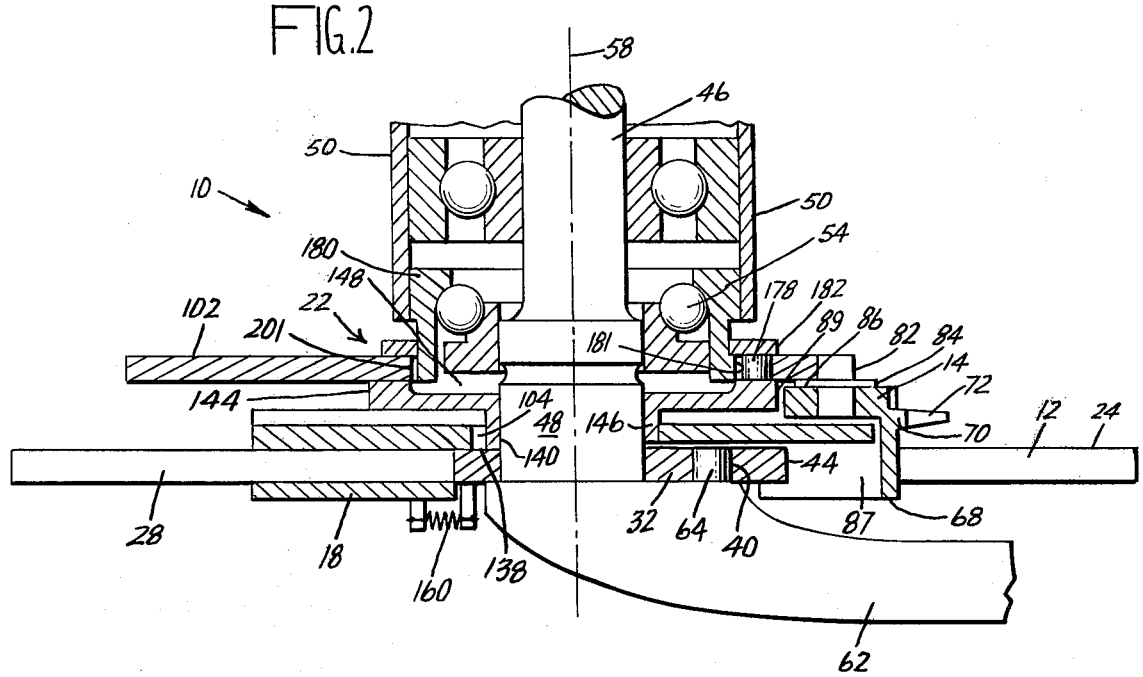
FIG. 2 is a quarter sectional view of the drive taken along section line 2—2 of FIG. 1.
Figure 9:
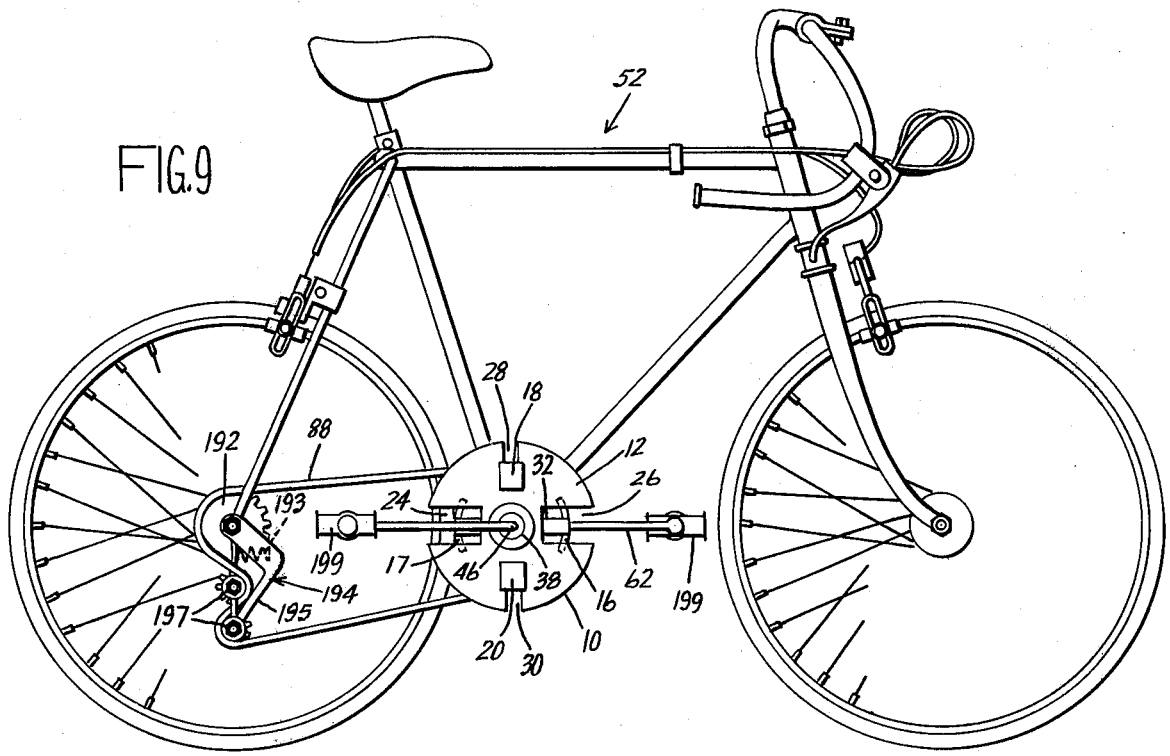
FIG. 9 is a plan view showing the installation of the multiratio drive on a bicycle.

Drive plate 12 is a generally circular disk made of stiff plate material such as steel. Plate 12 is provided with a first pair of generally rectangular, relatively wide slots 24, 26, and a second pair of relatively narrow slots 28, 30, with slots 24, 26 being disposed orthogonally with respect to slots 28, 30. Plate 12 further includes a crank arm portion 32 which extends radially outwardly and centrally of slot 24. The bottom edge 34 of slot 26 includes an arcuate portion 36 which also extends generally radially outwardly within slot 26. A through hole 38 is provided through the center of plate 12 and a pedal arm mounting hole 40 is provided in portion 32 adjacent the end 44 thereof. Plate 12 is fixedly mounted to a pedal shaft 46 adjacent the end 48 thereof. Pedal shaft 46 is mounted in conventional manner to a pedal shaft housing 50 (FIG. 2) of a bicycle 52 (FIG. 9) by means of suitable bearings such as bearing 54 (FIG. 2), end 48 of shaft 46 extending outwardly from housing 50 (FIG. 2). Plate 12 is fixedly secured to the end 48 as by press fitting or welding whereby plate 12 is rotatable with shaft 46 about axis 58 thereof.

A conventional bicycle pedal arm shown only fragmentarily for clarity at 62 of FIG. 2 is fixedly secured to end 48 of shaft 46 and includes a pin portion 64 which is received within hole 40 whereby plate 12 is drivingly coupled to the arm 62 for rotation therewith.

Figure 4:
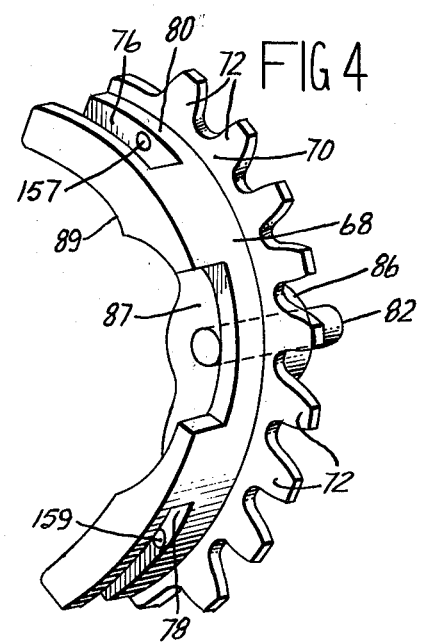
FIG. 4 is a perspective view showing details of a driven element including means for operatively engaging an endless drive element.

Driven elements 14, 16 are identical and a description of element 14 will suffice for both. Referring particularly to FIG. 4, element 14 comprises a generally arcuate body 68 having an arc of about 90°. Body 68 is provided with a sprocket flange portion 70 of generally arcuate shape and provided with a plurality of roller chain or bicycle chain engaging teeth as at 72. Arcuate body 68 is provided with a pair of parallel, spaced-apart slots 76, 78 dimensioned slidably to engage plate 12 with driven element 14 being disposed within slot 24 as best seen in FIG. 1. Spacing portions 80, 81 separate slots 76, 78 from flange portion 70 to provide the necessary clearance for bicycle chain 88 (FIGS. 1, 9 and 10 only) engaged therewith.

A cam follower 82 extends normally outwardly from surface 84 of element 14 (FIGS. 1, 2, and 10 only), follower 82 having an enlarged portion 86 and being secured to element 14 as by press fitting. Element 14 has an arcuate recess 87 formed in the radially inner surface 89 thereof to provide clearance for portions of the cam means 22. Element 16 is identical to element 14 and is slidably received within slot 26 for sliding movement therein in a direction radially of axis 58.

Figure 6:
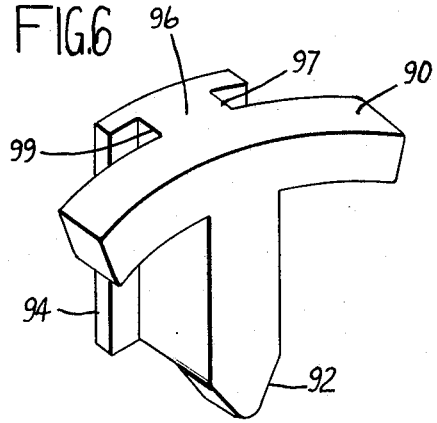

Elements 18, 20 are also identical and a description of element 18 will suffice for both. As best seen in FIGS. 5 and 6, element 18 includes an arcuate portion 90 having an arc of about 60° and an outside radius substantially identical to the outside radius of the arcuate portion of body 68. An elongated cam follower portion 92 extends radially inwardly of arcuate portion 90 and a flange portion 94 is disposed in parallel, spaced-apart relationship to follower portion 92 with portions 92, 94 being coupled together by a guide portion 96. Guide portion 96 has a horizontal width extending between sides 97, 99 thereof about equal to the width of slots 28, 30 whereby element 18 is slidably received in slot 28 of plate 12 for sliding movement in a direction radially of axis 58. Again, element 20 is identical to element 18 and is slidably received in slot 30 for movement radially with respect to axis 58.

It will now be observed that elements 14, 16, 18 and 20 together form a generally circular array of elements which can slide radially inwardly and outwardly with respect to plate 12. As will be explained below, this radial movement is controlled by cam means 22 whereby the radial position of elements 14, 16, 18, and 20 are always substantially identically displaced from the axis 58 and the array of elements 14 through 20 is always generally circular.

Cam means 22 comprises first and second cams 102, 104. Cams 102, 104 are illustrated closely to scale and as illustrated provide ten different drive ratios. Cam 102 is made of plate material, preferably steel, and is of a generally oval shape as viewed in plan. The circumferential surface 106 thereof has an irregular contour which includes a multiplicity of radially recessed indentations 108a, 110a, 112a, 114a, 116a, 118a, 120a, 122a, 124a, and 126a. For each of indentations 108a through 126a, cam 102 is further provided with a second multiplicity of indentations 108b, 110b, 112b, 114b, 116b, 118b, 120b, 122b, 124b, 126b. Each of indentations 108a through 126a is disposed diametrically opposite the similarly numbered ones of indentations 108b through 126b. That is indentations 108a and 108b are disposed diametrically oppositely, indentations 118a and 118b are disposed diametrically oppositely, etc. Each correspondingly numbered pair of indentations such as indentations 108a and 108b are further equally radially displaced from the axis 58. Surface 106 is further seen to be symmetrical about a line or major axis 109 whereby third and fourth multiplicities of indentations 108c through 126c and 108d through 126d are formed symmetrically opposite indentations 108a through 126a and 108b through 126b, respectively, the indentations denoted 108a, 108c and 108b, 108d being the same indentations. Cam 102 is provided with a hole 128 therethrough.

As best seen in FIG. 8, cam 104 is smaller than cam 102, but is of generally similar shape, cam 104 having an irregularly shaped surface 130 provided with a multiplicity of radially recessed indentations therein as at 132. Indentations 132 are equal in number to the number of indentations of cam 102 and are, as with cam 102, arranged in equally radially spaced, diametrically disposed pairs, such as pair 134a and 134b. Cam 104 is also symmetrical about its major axis 111 whereby each indentation, such as indentation 134a, is directly opposite and equally radially displaced as the oppositely displaced indentation, such as indentation 134c. Cam 104 is provided with a hub portion 138 disposed coaxially of axis 58, hub 138 having a hole 140 therethrough.

Each indentation 108a through 126a, 108b through 126b, 108c through 126c, 108d through 126d, of cam surface 106, and all the indentations such as indentations 134a, 134b, and 134c of cam surface 130 are separated by a radially outwardly extending apex as at 137. The sides of each of the indentations such as sides 139, 141 of indentation 112a are sloped or tapered towards the respective apexes 137.

Referring now particularly to FIG. 2, cam means 22 further includes a hub member 144, member 144 being rotatably received on end 48 of pedal shaft 46. Hub 144 includes an inner hub flange 146 which extends axially (downwardly as viewed in FIG. 2) towards end 48 of shaft 46 and is disposed in abutting engagement with plate 12. Flange 146 has an outside diameter dimensioned to receive cam 104 thereupon, cam 104 being secured as by welding. Hub 144 may be axially recessed as at 148 and cam 102 is secured to hub 144 in a position axially opposite cam 104 as by welding. Cams 102, 104 are disposed with their major axes 109, 111, respectively, disposed orthogonally as best seen in FIG. 1. Hub 144 is rotatably received on end 48 of shaft 46 as shown in FIG. 2. Cam surfaces 106, 130 operatively engage follower pins 82 of driven elements 14, 16 and cam follower portions 92 of driven elements 18, 20 respectively.

A pair of tension springs 150, 152 are coupled between circumferentially opposite ends of driven members 14, 16 by means of suitable pins as at 154, 156, pins 154, 156 being press fitted in suitable holes 157, 159 in members 14, 16 (FIG. 5 only) whereby springs 150, 152 resiliently urge driven elements 14, 16 radially inwardly.

In a similar manner, driven elements 18, 20 are coupled to plate 12 by means of tension springs as at 160 (FIG. 2 only) whereby tension springs 160 resiliently urge elements 18, 20 radially inwardly towards axis 58. It will now be observed that the springs 150, 152 and springs 160 maintained driven elements 14, 16, 18 and 20 in sliding engagement with cam surfaces 106 and 130.

Referring now to FIG. 3, there is shown in enlarged detail a unidirectional coupling or clutch 164 which, as will be explained in detail below, enables shifting or otherwise altering the ratio of multiratio drive 10 of the present invention. The unidirectional clutch means 164 comprises a plurality of symmetrically disposed notches 166, 168, and 170 extending radially outwardly of hole 128. Each of notches 166 through 170 has a radially uniformly increasing depth whereby the bottom surfaces as at 172 thereof are sloped with respect to the circumference of hole 128 and are bounded by opposite end walls 174, 176. Disposed within each of notches 166, 168, 170, is a roller as at 178 having a diameter slightly larger than the minimum depth of the notches 166 through 170. The depth of the notches 166 through 170 adjacent walls 176 is deeper than the diameter of the rollers 178. Each roller 178 is resiliently urged towards ends 174 of the notches 166 through 170 by means of compression springs 179.

In assembly, hub 144 is mounted on shaft end 48 as described above. The hole 128 in cam 102 is slidably received on the outside diameter of a bearing assembly 180 whereby cam 102 is free to rotate with respect thereto. Roller elements 178 engage circumferential surface 181 of the bearing assembly 180 and are maintained in position by means such as a cover plate 182. Bicycle chain 88 is trained over driven elements 14, 16, 18, and 20, chain 88 being operatively engaged by the teeth 72 of elements 14 and 16. Chain 88 is further trained about a conventional driven sprocket and take-up assembly 192, 194. Driven sprocket 192 also incorporates a unidirectional clutch whereby the driven sprocket 192 transmits power from the chain 88 to the rear wheel 193 of the bicycle 52 when power has been applied thereto in one rotational direction and permits free wheeling thereof when the pedals are being held stationary. Take-up mechanism 194 is conventional, being spring-loaded as at 193 and includes a pivot arm 195 and one or more sprockets as at 197 and operates to remove slack from chain 88 when the ratio and therefore the effective diameter of the drive mechanism 10 is changed.

In operation, it will be assumed that mechanism 10 as viewed in FIG. 1 is rotated in a counter clockwise direction (arrow 210) to propel the bicycle forwardly, the mechanism being able to remain stationary or free wheel in a clockwise direction due to the unidirectional clutch in the driven sprocket 192. It will also be assumed that the drive mechanism 10 has the components thereof in the position shown in FIG. 1. As motive power is applied to the pedals 199 (FIG. 9), this motive power is transmitted to drive plate 12. Driven elements 14, 16 and driven elements 18, 20 are in their retracted positions by reason of springs 150, 152, and springs 160 urging same radially inwardly of the slots 24, 26, 28 and 30, respectively. The radial displacement of each of the driven elements 14, 16, 18 and 20 is determined by the cam surfaces 106 and 130 engaging cam follower portions 92 and cam pins 82 of the driven elements 18, 20 and 14, 16, respectively. As best seen in FIG. 2, hub 144 is able to rotate freely about pedal bearing 180 by reason of the clearance 201 (FIG. 3 only) therebetween. It will further be observed that because of the shape of the cam surfaces 106, 130 and the action of the springs 150, 152, and 160, the cam pins and cam follower portions 82, 92 are detented or otherwise restrained from relative rotational movement with respect to the cam surfaces 106, 130. Thus, as plate 12 is rotated in a counter clockwise direction, the driven elements 14, 16, 18, and 20 rotate therewith by reason of their engagement with the slots 24, 26, 28 and 30, respectively, and the cam means 22 is also caused to rotate in synchronism with the driven elements 14 through 20 by reason of the detent coupling therebetween. Correspondingly, all of the driven elements are maintained in predetermined radial positions and in a generally circular array with respect to the axis 58.

To effect a change in the effective diameter of the drive means 10, that is, to alter the radial displacement of the driven elements 14 through 20 from the axis 58, motive power or pressure is applied to the pedals to rotate same backwardly. This is in a direction clockwise as the mechanism 10 is viewed in FIG. 1. As the pedals 199 are rotated clockwise, the unidirectional clutch 164 prevents rotation of the cam means 22 in a counter clockwise direction. This is effected by the rollers 178 becoming wedged between the surfaces 172 of recesses 166, 168, 170 and the circumferential surface 181 of bearing assembly 180. Simultaneously, the unidirectional clutch means in the driven sprocket 192 permits plate 12 and therefore the driven elements 14, 16, 18 and 20 to be rotated in a clockwise direction. Since the driven elements 14 through 20 are retained in engagement with the indentations of cam surfaces 106 and 130 by springs 150, 152 and 160, respectively, sufficient force will cause the driven elements 14 through 20 to ride over the apexes such as apex 137 of cam 102 and into the next adjacent indentation. If the clockwise movement of the drive plate 12 is now terminated, the driven elements 14 through 20 will be retained in operative engagement with these next adjacent ones of the indentations. Further, because these indentations are disposed at a greater radial displacement from the axis 58, all of the driven elements are positioned in an expanded circular array about the axis 58 thereby defining a sprocket having a larger effective diameter. This in turn provides a different drive ratio between the drive 10 and the driven sprocket 192. Further clockwise rotation of the plate 12 similarly will cause the driven elements 14 through 20 to move incrementally from one set of indentations in the cam surfaces 106 and 130, respectively, thereby providing a multiplicity of different radial displacements for all of the driven elements to thereby provide a multidiameter sprocket.

It will be observed that enlargement of the radial displacement of driven elements 14 and 16 can only be effected when the driven elements 14 and 16 are in generally horizontally displaced relationship as viewed in FIG. 1, since simultaneous engagement between the driven elements 14 and 16 and chain 88 will prevent relative movement between the two driven elements. Preferably, the crank arm portion 32 of drive plate 12 is oriented so that the pedals will be horizontal with the ground when driven elements 14 and 16 are engaged and disengaged from chain 88 respectively.

It will further be observed that when the driven elements 14, 16, 18 and 20 are in their greatest radially displaced positions, i.e., engaging recesses 126a, 126b, and 135a, 135c of cams 102, 104, respectively, further relative movement between the cam means 22 and plate 12 will cause incrementally decreasing radial displacements of the driven elements 14 through 20. It will now be apparent that to effect alteration of the effective diameter of the driven elements, it is only necessary to rotate the plate 12 clockwise with respect to the cam means 22, with each one-quarter revolution therebetween effecting movement of the driven elements 14 through 20 from their minimum to maximum radial displacements and another quarter revolution being required to move the driven elements from their maximum radial displacements to their minimum displacements.

While the invention has heretofore been described as utilizing driven elements 14, 16 adapted to engage a conventional bicycle chain 88, it will be apparent to those skilled in the art that driven elements 14, 16 can be adapted to engage a V-belt or other type of endless drive element and chain 88 can be changed accordingly, it only being necessary that driven elements 14, 16 engage the driven element while the other driven elements 18, 20 be adapted to slidably engage same.

It will further be apparent that, while the invention has been described as providing ten different effective diameters for the driven elements 14 through 20, the mechanism could be adapted to provide different numbers of drive ratios. The drive 10 has further been described as mounted directly to the pedals and pedal hub of a bicycle but it will be apparent to those skilled in the art that the drive could be coupled directly to the driven wheel of a bicycle. It will also be apparent that the drive mechanism, while described as specifically applied to a bicycle, is also adapted for use in other applications wherein multiratio drives are required.

It will also be apparent to those skilled in the art that the unidirectional clutch means could be replaced with a disk brake or the like assembly for preventing rotation of the cam means 22 while the plate 12 is being rotated, operation of the brake mechanism being effected by the operator.

In a working embodiment of the invention, the following dimensions were used for the cams 102, 104, the dimensions being specified in angle and radial displacement of each of the indentations of the cam surfaces 106, 130 from their smallest to largest diameter.

|  | Cam 102 | |
| --- | --- | --- |
|  | Degrees | Inches |
| 108a,b,c,d | 0 | 3.228 |
| 110a,b,c,d | 5.0 | 3.546 |
| 112a,b,c,d | 18.0 | 3.864 |
| 114a,b,c,d | 29.5 | 4.182 |
| 116a,b,c,d | 41.0 | 4.500 |
| 118a,b,c,d | 52.0 | 4.818 |
| 120a,b,c,d | 62.0 | 5.136 |
| 122a,b,c,d | 71.0 | 5.454 |
| 124a,b,c,d | 79.5 | 5.772 |
| 126a,b,c,d | 87.5 | 6.090 |

|  | Cam 104 | |
| --- | --- | --- |
|  | Degrees | Inches |
|  | 0 | 1.800 |
|  | 13.0 | 2.436 |
|  | 25.0 | 3.072 |
|  | 37.0 | 3.708 |
|  | 48.0 | 4.344 |
| 134a,b,c | 58.0 | 4.980 |
|  | 67.0 | 5.616 |
|  | 75.5 | 6.252 |
|  | 83.0 | 6.888 |
| 135a,c | 90.0 | 7.524 |

What is claimed is:

1. A multiratio drive comprising:
   a. a drive plate mounted for rotation about an axis and means for drivingly coupling said drive plate to a source of motive power,
   b. an even numbered plurality of driven elements mounted to said drive plate for sliding movement radially of said axis, said driven elements being disposed in a generally circular array, alternate ones of said driven elements including means for drivingly engaging an endless drive element, the remaining ones of said driven elements being in slidable contact with said endless drive element,
   c. cam means mounted for rotation about said axis and operatively engaging said driven elements for positioning said driven elements at selected ones of a plurality of radially spaced-apart positions in response to relative rotational movement between said driven elements and said cam means,
   d. detent means coupled between said driven elements and said cam means for restraining same against relative movement, and
   e. shift means for causing selected rotational movement between said driven element and said cam means to thereby alter the relative rotational positions thereof, the radial displacement of all said driven elements from said axis being generally equal for all relative positions of said driven elements and said cam means.

2. The device of claim 1 wherein said cam means includes at least one cam having a perimetral cam surface, said perimetral cam surface having a variable displacement from said axis and including a plurality of lobe portions equal in number to the number of said driven elements, said perimetral surface being symmetrical with respect to the said axis.

3. The drive of claim 2 wherein said detent means includes spring means for resiliently maintaining said driven elements in engagement with said perimetral cam surface, and a multiplicity of circumferentially juxtaposed indentations in said cam surface, each said indentation having tapered sides, there being an apex between each adjacent pair of indentations having a radial displacement greater than the radial displacement of said adjacent pair of said indentations, said driven elements each including a cam follower element slidably engaging different individual ones of said indentations.

4. The drive of claim 2 wherein said cam means includes two of said cams, one of said cams being operatively engaged with said alternate ones of said driven elements, the other of said cams being operatively engaged with all others of said driven elements.

5. The drive of claim 4 wherein said detent means includes spring means for resiliently maintaining said driven elements in engagement with said perimetral cam surfaces and a multiplicity of circumferentially juxtaposed indentations in each of said cam surfaces, each of said indentations having radially outwardly and convergently tapered sidewalls, there being an apex between each adjacent pair of indentations of each of said cams, each said apex having a radial displacement greater than the radial displacement of said adjacent ones of said indentations, said driven elements each including a cam follower element, the cam follower elements of said alternate ones of said elements and the cam follower elements of said others of said driven elements engaging individual ones of said indentations of said first and said second cams, respectively.

6. The drive of claim 5 wherein said first and second cams are axially juxtaposed.

7. The drive of claim 6 wherein there are two of said alternate ones of said driven elements and two of said others of said driven elements, said first and said second cams each including two said lobe portions.

8. The drive of claim 7 wherein each of said lobe portions is symmetrical about a line extending perpendicular to said axis, there being an equal number of said indentations on each of said lobes on each side of said line, adjacent ones of said indentations on each side of said line being disposed at a radial displacement greater than and less than the adjacent ones of said indentations, respectively.

9. The drive of claim 2 wherein said shift means includes a unidirectional clutch means coupled between said cam means and an object stationary with respect thereto for permitting free rotation of said cam means about said axis in a first rotational direction and preventing rotational movement of said cam means about said axis in a rotational direction opposite said first rotational direction, said drive plate being bidirectionally rotatable about said axis whereby said drive plate and said cam means are synchronously rotatable about said axis in said first rotational direction, rotation of said drive plate in said opposite rotational direction causing relative rotational movement therebetween.

10. The drive of claim 1 wherein said shift means includes means for selectively locking said cam means against rotational movement about said axis whereby rotation of said drive plate when said cam means is locked produces relative rotational movement therebetween.

11. The drive of claim 1 wherein said endless drive element is a bicycle chain, said engaging means including sprocket teeth.

12. The drive of claim 1 wherein said drive plate includes a plurality of radially extending slots, there being one of said slots for each said driven element, said driven elements each including a pair of slots disposed circumferentially of the arc thereof, said driven elements and said last mentioned slots being dimensioned to be slidably received in said radially extending slots.

13. The drive of claim 9 wherein said object is a bicycle and further including a driven sprocket mounted for rotation about a second axis, said endless drive element being a bicycle chain trained around said driven elements and said driven sprocket, and further including a chain take-up device engaging said bicycle chain for removing slack from said bicycle chain in response to alteration of the effective diameter of said circular array of driven elements.

14. The drive of claim 13 wherein said first axis is the axis of the pedal shaft of the bicycle, said driven sprocket being coupled to the rear wheel of said bicycle and further including a second unidirectional clutch means for coupling said driven sprocket to said rear wheel, said source of motive power being the pedals of said bicycle.

* * * * *